Figure 1:
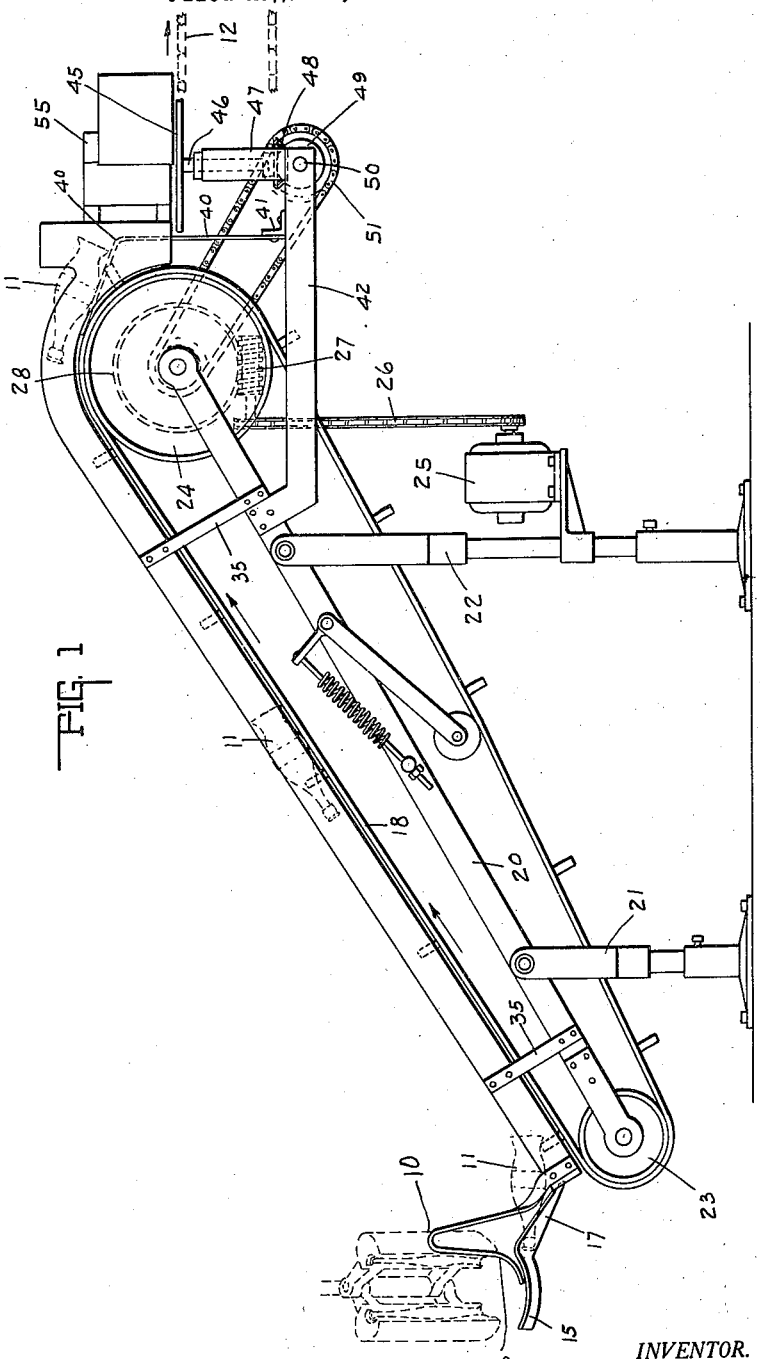

Jan. 8, 1924.

C. I. HALL ET AL

CONVEYER IN GLASS MAKING APPARATUS

Filed Aug. 11, 1919

1,480,063

2 Sheets-Sheet 1

INVENTOR.
CLARENCE I. HALL
ALEXANDER SAMUELSON.
BY
Lockwood Lockwood
ATTORNEYS.

Jan. 8, 1924.
C. I. HALL ET AL
1,480,063
CONVEYER IN GLASS MAKING APPARATUS
Filed Aug. 11, 1919    2 Sheets-Sheet 2
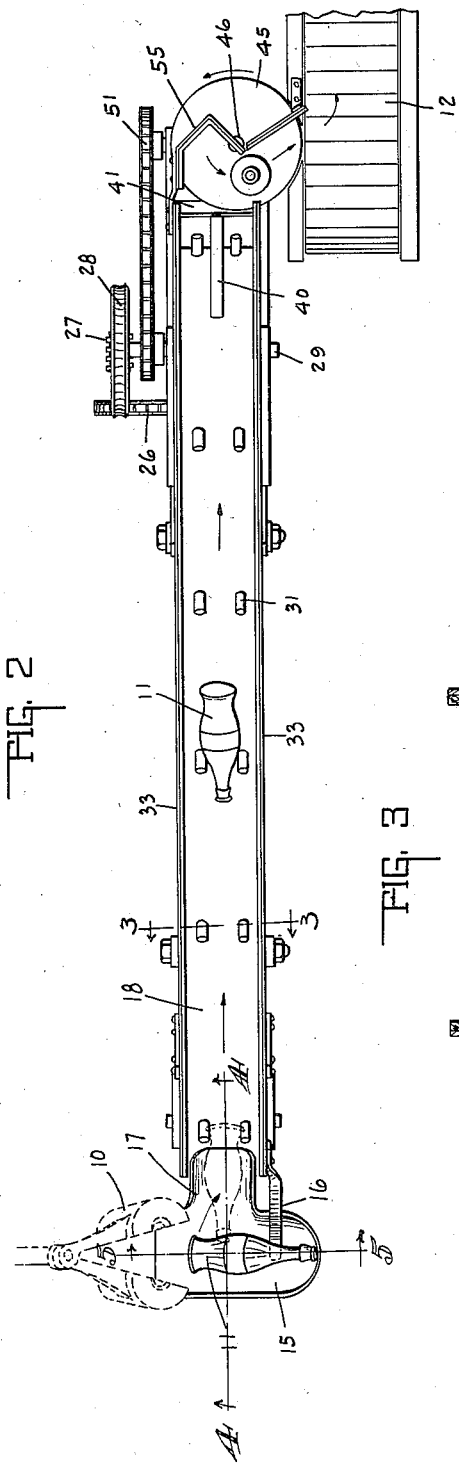
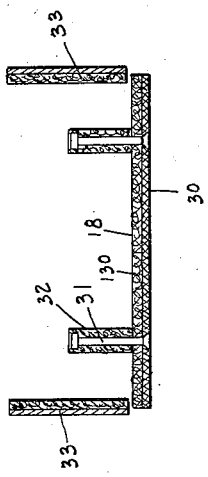
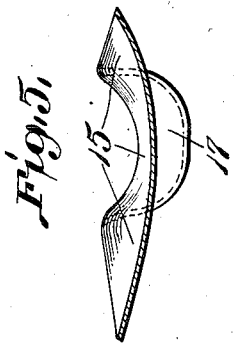
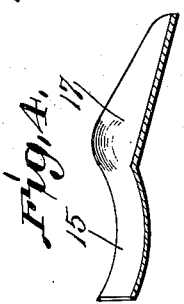
INVENTOR.
CLARENCE I. HALL
ALEXANDER SAMUELSON.
BY
ATTORNEYS.

Patented Jan. 8, 1924.

1,480,063

UNITED STATES PATENT OFFICE.

CLARENCE I. HALL AND ALEXANDER SAMUELSON, OF TERRE HAUTE, INDIANA, ASSIGNORS TO CHAPMAN J. ROOT, OF TERRE HAUTE, INDIANA.

CONVEYER IN GLASS-MAKING APPARATUS.

Application filed August 11, 1919. Serial No. 316,723.

*To all whom it may concern:*

Be it known that we, CLARENCE I. HALL and ALEXANDER SAMUELSON, citizens of the United States, and residents of Terre Haute, county of Vigo, and State of Indiana, have invented a certain new and useful Conveyer in Glass-Making Apparatus; and we do hereby declare that the following is a full, clear, and exact description thereof, reference being had to the accompanying drawings, in which like numerals refer to like parts.

The object of this invention is a particular arrangement for the conveyance of glass bottles and other articles immediately from the machine or mold for making the same and delivering them in an upright or other desired position on another conveyer or station, and so as not to abrade, scratch or otherwise injure the surface of the glass articles. Heretofore there has been experienced by the manufacturers of bottles and other glass ware considerable difficulty in the use of mechanical means for the removal of glass articles from the machine or molds because of injury thereto by the means employed for such removal.

One feature of this invention consists in providing a conveyer with the conveying surfaces thereof cushioned or covered with soft material, and with means for grasping the bottle or the like and conveying it from the machine or mold before the glass has become cold and without injuring it in any way.

Another feature of the invention consists in combining with said cushioned conveyer, a receiver for the bottle or the like as it comes from the machine or mold, so arranged that the bottle or the like will pass by gravity or automatically to the conveyer.

Another feature of the invention consists in the combination of the receiving means, and a conveyer leading therefrom, and means for receiving the bottle or the like from the conveyer in an upright or other desired position.

The various features of the invention will be understood from the accompanying drawings, the following description and claims.

In the drawings Fig. 1 is a side elevation of the mechanism with parts of the glass mold and of the second conveyer broken away. Fig. 2 is a plan view thereof. Fig. 3 is a section on the line 3—3 of Fig. 2. Fig. 4 is a sectional view taken on the line 4—4 of Fig. 2 and in the direction of the arrows upon the bottle receiving and deflecting spoon. Fig. 5 is a sectional view taken along the line 5—5 of Fig. 2 and in the direction of the arrows of the same part.

There is shown herein a mold 10 which is intended to be typical of any mold or any machine for making glass bottles 11 and the like. The invention is not limited to any particular construction or arrangement of the mold or glass making machine.

There is also shown a conveyer 12 made of metal or otherwise in any usual way, whereby the glass articles are conveyed to the leer or as desired. The invention relates to the means herein set forth which is located between the mold and the conveyer 12 for handling and conveying the glass articles before the glass has become entirely hard.

There is secured adjacent to the mold 10 a substantially T- or spoon-shaped plate 15 for receiving the bottle, and upon which the bottle falls as the mold is opened. It is made of metal and lined with some yielding material. The bottle falls on said receiving member 15 in the position shown in Fig. 2 at the left hand end. The neck of the bottle in falling strikes against the yielding spring 16, located immediately above the end of the receiving member, as shown at the left hand in Fig. 1, and slides down, bottom first, or as desired, the inclined chute-like portion 17 of the receiving member 15. As the bottle slides down said surface 17 it comes in contact with a conveyer belt 18 that travels upward at an angle in the direction of the arrow as shown in Fig. 1. The conveyer apparatus as a whole includes a frame with side bars 20 mounted on the pieces or standards 21 and 22 which are vertically adjustable, and at the lower end of said bars 20 there is a rotatably mounted drum or pulley 23 over which the conveyer 18 travels. It is caused to travel by the drum or pulley 24 at the upper end, which is driven by a motor 25 through intermediate driving mechanism, including the belt 26 and the worm 27 which drives the worm wheel 28 on the shaft 29 on which said drum 24 is secured.

The conveyer belt 18 is formed as shown in Fig. 3 with a layer of strong flexible material 30 and an upper thicker and softer layer of material 130. Posts or pins 31 extend upward at right angles from said conveyer belt in pairs, as shown in Figs. 2 and 3, and each post is surrounded by a soft material 32. The cushioning material employed is preferably asbestos, as that protects the glass article and handles it safely while hot. The distance between the pair of posts is less than the width of the body of the glass article to be conveyed. There are also side bars 33 lined with soft material mounted beside the conveyer belt 18 on the bars 35, which are secured to the frame bars 20, as seen in Fig. 1, so as to prevent any bottles or glass articles from escaping from the conveyer sidewise.

As the bottom of the bottle comes down the inclined plate 17 from the receiving member 15 and engages the conveyer belt 18, it will be engaged by a pair of pins 31, and dragged off the inclined plate 16 and be caught around the neck by the succeeding pair of pins so that the bottle will be in the position shown in the model Fig. 2, that is with its neck projecting downward between the pair of pins; and in that position it will be conveyed to the upper end of the conveyer. Since all of the parts with which the bottle comes in contact on this conveyer are lined with soft material there is no danger of the glass article being abraded or injured before the glass is finally cold.

When a glass article reaches the top of the conveyer just described, it will be engaged on its under side by a flat spring 40, which extends up from a cross bar 41 on a pair of bracket bars 42, secured to and extending rearwardly from the frame bars 20. The bottle will ride upon and over the top of the spring 40, being carried there by the pins as the spring 40 extends tangentially of the drum 24 over which the belt and pins move. After the glass article has traveled sufficiently far the pins will leave and release the bottle and it will fall down bottom first on a receiver in the form of a disk 45, see Fig. 2. Said disk is mounted on a shaft 46, as seen in Fig. 1, which extends through a member 47 in which it is mounted, and is driven by the bevel gears 48 on the shaft 46 and the bevel gear 49 on the shaft 50 mounted in the bars 42, which in turn is driven by the belt 51.

As the circular plate 45 turns in the direction of the arrow, it carries the bottle over to one side and discharges it on the conveyer 12 which is made of metal or in any other usual way and by this time the glass has become set so hard that said conveyer 12 will not injure it. A crooked guide plate 55 extends from the lateral disk 45 and holds the bottle thereon and guides it on to the conveyer 12.

It is thus seen that this intermediate conveyer can be located between the machine and the permanent conveyer 12, and will serve to receive the glass ware before it becomes fully hardened, in an upright position and protect the same in the danger stage. It is also automatic in its receipt and conveyance of glass ware output of the machine. We show and consider the mold herein as a part of the machine without the entire machine being shown, as the particular construction of the machine is immaterial.

The apparatus herein shown for the purpose of illustrating the nature of the invention, has means for conveying bottles and discharging them in an upright position, but the invention is not limited to said particular means, as the means is adaptable for handling other glass articles besides bottles, nor is the invention limited to said parts with an upwardly inclined conveyer, as the conveyer may extend in any direction desired from the mold and receiver. Therefore by the word bottle in the claims is meant any glass article which is capable of being conveyed like a bottle.

The invention claimed is:—

1. A conveyer for bottles after they have been formed and before they are cold, having a movable conveyer belt, and pairs of pins located at intervals thereon adapted to receive between them the necks of the bottles and hold them while being conveyed.

2. A conveyer for bottles after they have been formed and before they are cold, having a movable conveyer belt, pairs of pins located at intervals thereon adapted to receive between them the necks of the bottles and hold them while being conveyed, the surfaces of said belt and pins being cushioned to protect the surface of the bottles.

3. A conveyer for glass articles after they have been formed and before they are cold, having a movable conveyer belt, means located at intervals thereon adapted to receive a bottle and hold it while being conveyed, and side bars located at the two sides of said conveyer to prevent the bottle from escaping from the sides of the conveyer belt, the surfaces of said belt, the holding means and side bars being cushioned to protect the surface of the bottles.

4. A conveyer for conveying glass articles, having a conveyer belt, means thereon for catching glass articles and conveying the same and holding them longitudinally of the belt as the belt moves, and means at the discharge end of said conveyer belt for separating and discharging the glass articles therefrom in a predetermined position.

5. A conveyer for conveying glass bottles having a conveyer belt, projecting means on the belt for engaging a bottle and conveying it with its axis extending longitudinally of the belt, and a longitudinally extending plate at the discharge end of the conveyer for separating and removing the bottle from the conveyer belt and the pins.

6. A conveyer for conveying glass bottles having a conveyer belt, means thereon for catching the bottles and holding them with their axes extending longitudinally of the belt as they are being conveyed and a longitudinally extending plate at the opposite end of the conveyer belt for separating the bottles from the conveyer belt and causing them to be discharged in an upright position on a receiver.

7. A conveyer for conveying glass bottles having a conveyer belt, means for catching the bottles and holding them with their axes extending longitudinally of the belt as they are being conveyed, another conveyer belt near the end of the first conveyer belt, and means for depositing the bottles in an upright position on said second conveyer belt.

8. A conveyer for conveying glass bottles having a conveyer belt, a pair of pins projecting therefrom for engaging the neck of a bottle and conveying it with its axes extending longitudinally of the belt, a longitudinally extending plate at the discharge end of the conveyer belt for separating the bottle from the conveyer belt and the pins, a horizontal rotatable disk for receiving the discharged glass bottles, and another conveyer belt upon which said disk discharges the glass bottles.

9. A conveyer belt for conveying glass bottles having a conveyer belt, a pair of pins projecting therefrom for engaging the neck of a bottle and conveying it with its axis extending longitudinally of the belt, a longitudinally extending plate at the opposite end of the belt for separating the bottle from the belt and the pins, a horizontal rotatable disk for receiving the discharged bottle, another conveyer belt upon which the disk directs and discharges the bottle, and a guide immediately above said disk for guiding said bottle to said second belt.

10. In a mechanism for handling bottles, the combination with a conveyer, of an inclined elevator apron, a horizontal disk disposed to receive from the apron and to discharge to the conveyer, means for directing bottles from the apron onto the disk, a guard overlying the disk and extending from its center in a direction opposed to the direction of rotation of the disk to limit tilting of bottles discharged from the apron, and means for intercepting bottles on the disk and for directing them therefrom to the conveyer.

11. In a mechanism for handling bottles, the combination with a conveyer, of an elevator apron provided with pairs of spaced pins arranged to receive and hold bottles on the apron, means for engaging and directing the bottles successively from the apron and its pins, a horizontal rotary disk disposed to receive the bottles from the apron and to discharge to the conveyer, a guard above the disk in the path of tilting movement of a bottle discharged to the disk from the apron, and a scraper disposed to intercept a bottle moving with the disk and to direct it therefrom onto the conveyer.

12. A mechanism for handling bottles comprising an endless conveyer apron movable upwardly and having means for engaging the sides of bottles to temporarily hold the bottles thereon, a conveyer, means disposed to receive bottles from the apron and to discharge them onto the conveyer, and means for guiding the bottles successively from the apron to said receiving means.

13. A substantially T-shaped channeled receiving plate adapted to be positioned between the mold discharge of a machine for making bottles and a conveyer, for receiving the bottles discharged from the mold upon one channeled arm of said plate, turning the bottle upon the opposite arm, and discharging the bottle from the other grooved arm of said plate on its side endwise to the conveyer.

14. A substantially T-shaped bottle transferring spoon plate comprising three channel arms, two arms being oppositely positioned to receive and turn the bottle, the remaining arm projecting downwardly from and laterally of the oppositely positioned arms for discharging the bottle.

In witness whereof we have hereunto affixed our signatures.

CLARENCE I. HALL.
ALEXANDER SAMUELSON.